Figure 1:
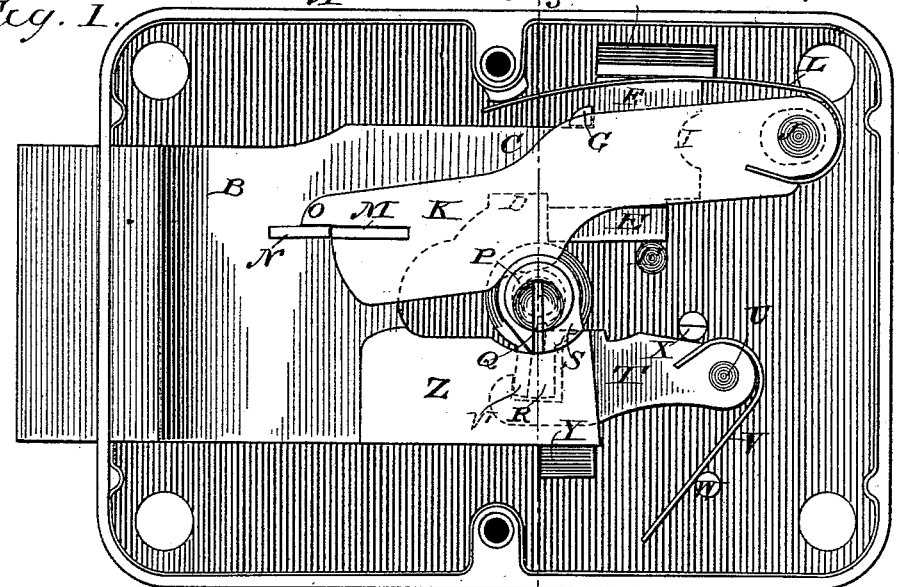

(Model.) 4 Sheets—Sheet 1.

W. H. TAYLOR.
LOCK.

No. 420,127. Patented Jan. 28, 1890.

Witnesses
H. C. Newman
C. S. Newman

Inventor
Warren H. Taylor
By his Attorneys
Hopkins & Atkins.

(Model.) 4 Sheets—Sheet 2.

W. H. TAYLOR.
LOCK.

No. 420,127. Patented Jan. 28, 1890.

Witnesses.
H. L. Newman
E. S. Newman

Inventor
Warren H. Taylor
By his Attorneys
Hopkins & Atkins

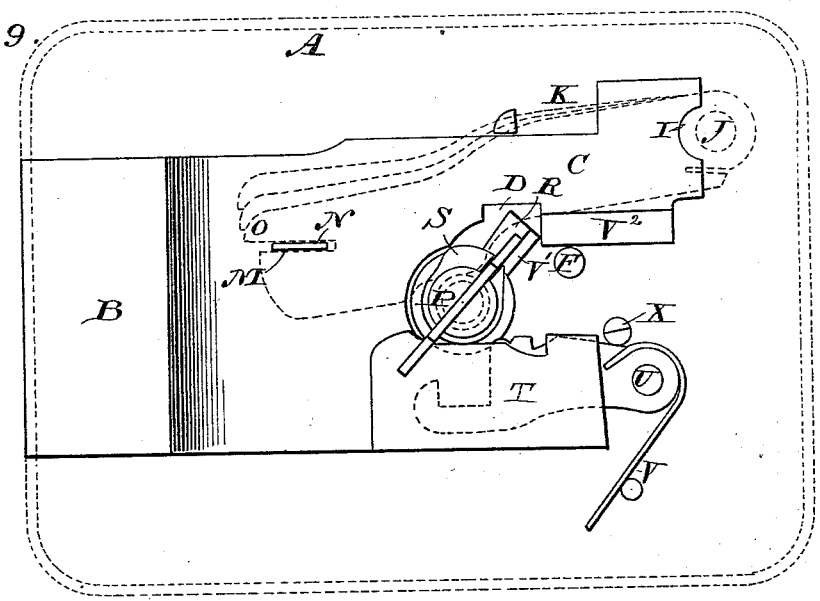
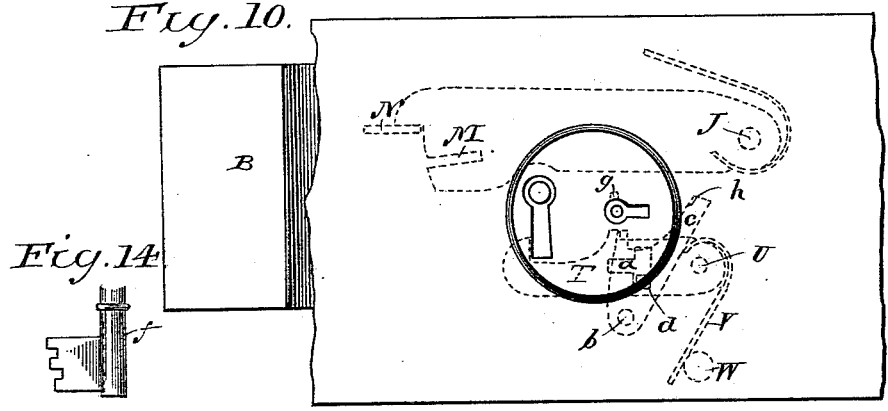
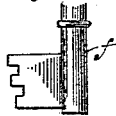
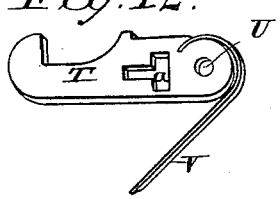
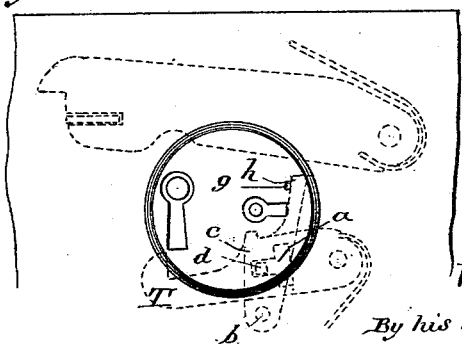
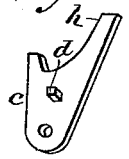

(Model.)  4 Sheets—Sheet 4.
W. H. TAYLOR.
LOCK.

No. 420,127. Patented Jan. 28, 1890.

Witnesses
H. C. Newman,
E. S. Newman,

Inventor
Warren H. Taylor,
By his Attorneys
Hopkins & Atkins.

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

LOCK.

SPECIFICATION forming part of Letters Patent No. 420,127, dated January 28, 1890.

Application filed March 12, 1889. Serial No. 303,018. (Model.)

*To all whom it may concern:*

Be it known that I, WARREN H. TAYLOR, of Stamford, in the county of Fairfield and State of Connecticut, have invented certain new and useful Improvements in Locks, of which the following is a specification, reference being had to the accompanying drawings.

My invention relates to that class of locks known as "guard-locks," in which the bolt-actuating mechanism, which is operated by one key, is locked by a guard mechanism, which is operated by a different key.

My improved lock is adapted to be used in a safety-deposit vault, or other place where a number of lock-boxes are under the care of the custodian of the place, who holds a key to each lock, while the renters of the boxes also hold keys, the two sets of keys being different and operating different parts of the locks. Locks of this general character, as heretofore made, especially those which have but one nosing, have been open to the objection that the main tumblers and the guard-tumblers being superimposed tended to diminish the security both of the main locking mechanism and also the guard mechanism, because in the limited space available it is not practicable to get a sufficient number of tumblers for each mechanism. In my lock the main locking mechanism and the guard mechanism are entirely independent, and are operated through different and independent key-holes. I prefer, as shown in the drawings, to use a pin-tumbler lock for the supplementary mechanism and flat tumblers in the main locking mechanism; but the type of either the main or supplementary locking mechanism may be varied without departing from the spirit of my invention. This combination of two types of locks affords the greatest security, and the construction and arrangement are such that my lock can be conveniently used in the small space which is usually available wherever it is applicable.

Figure 5:
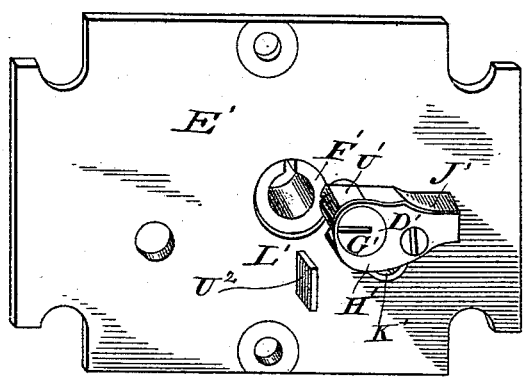

As above stated, the supplementary locking mechanism is entirely independent of the main locking mechanism, and in general its operation is to prevent the rotation of the key of the bolt-locking mechanism, either by dogging the hub in the case of the flat-key lock or the key itself of a lock using a round-stem key. In either form both key-holes are placed in one nosing, so that only one hole need be bored through the door. Another fact of practical utility when flat-key locks are used is that when both locks are secured the key-slots are at right angles to each other, as shown in Fig. 5, and the custodian of the guard-key in passing a row of locks and looking at the key-holes can see at a glance whether the locks are fully secured by both the locking mechanisms or not.

Figure 2:
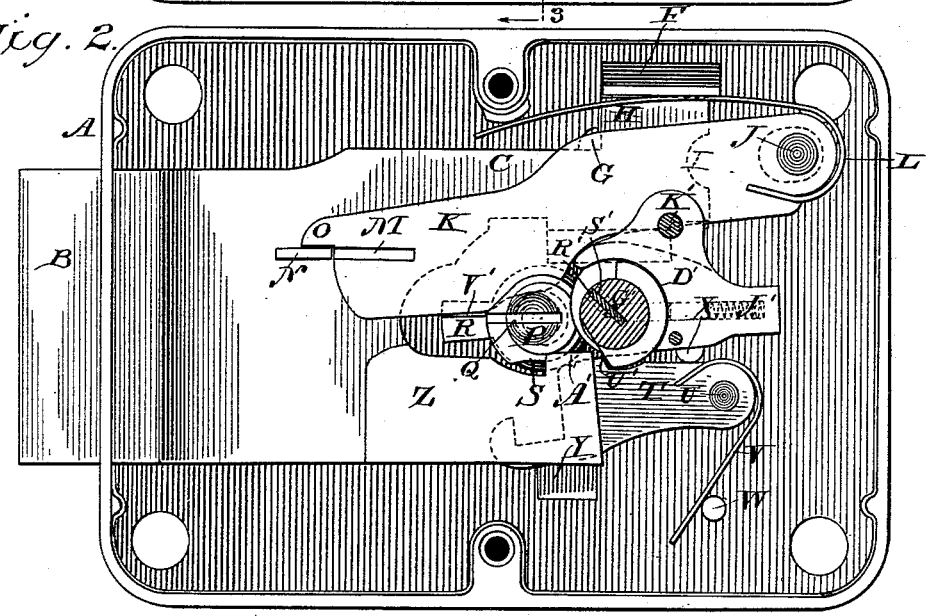
Figure 3:
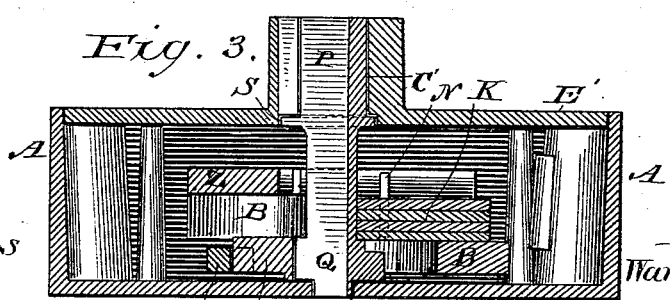
Figure 4:
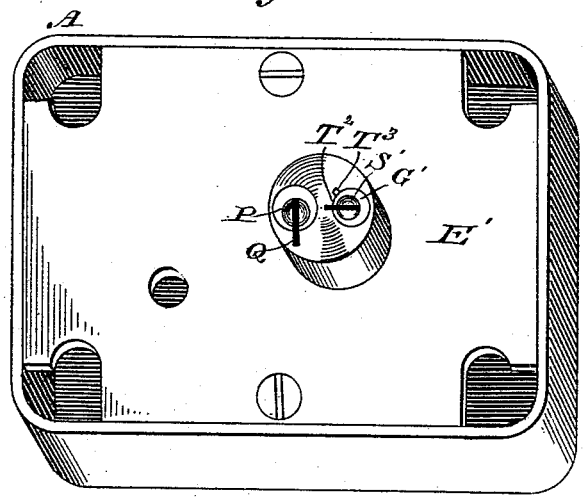
Figure 7:
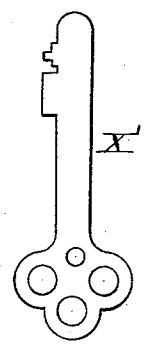
Figure 8:
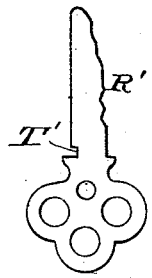
Figure 6:
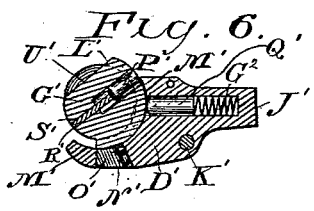
Figure 16:
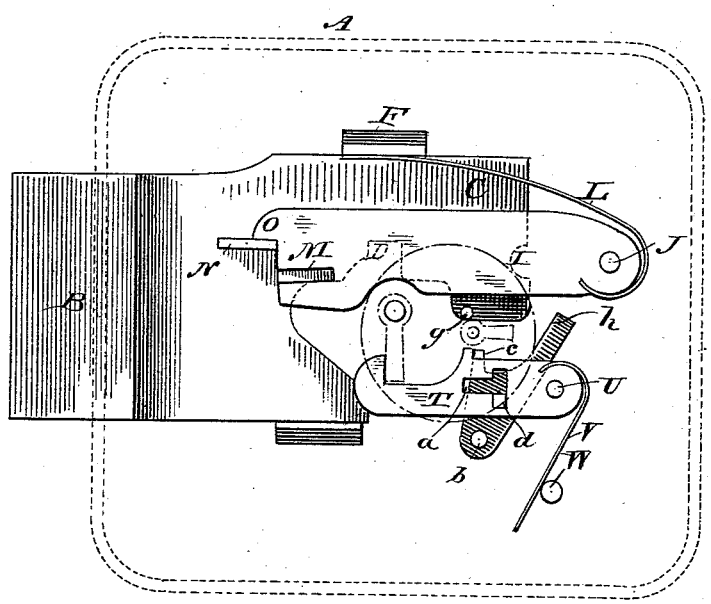

In the drawings, Figure 1 is a view of my improved lock with the cap-plate removed, so as to show the internal mechanism in locked position. Fig. 2 is a similar view showing the guard-lock mechanism in the unlocked position, but being in section through the hub of the guard-lock. Fig. 3 is a section on the line 3 3 of Fig. 1. Fig. 4 is a perspective view of my improved lock with the cap-plate in place. Fig. 5 is a perspective view of the cap-plate, showing the inner face of it and parts attached thereto. Fig. 6 is a horizontal section through the tumbler-case and the guard-key hub, showing the hub in the unlocked position. Fig. 7 is a view of a flat key, and Fig. 8 is a view of a flat guard-key. Fig. 9 is a skeleton view of my lock in the unlocked position. Fig. 10 is a skeleton view of a modified form of my lock adapted to the use of ordinary round-stem keys, the parts being shown in the unlocked position. Fig. 11 is a skeleton view of the same in the unlocked position. Fig. 12 is a view of the detent or dog and its spring shown in Figs. 10 and 11 detached. Fig. 13 is a view of the pivoted fence shown in Figs. 10 and 11 detached. Fig. 14 is a view of a round-stem main key, and Fig. 15 is a view of a round-stem guard-key. Fig. 16 is a skeleton view showing the mechanism of modified form of my lock and the construction of the bolt and the relations thereto of the dog and detent.

Since the bolt-actuating mechanism and the supplementary mechanism are each complete in itself, I shall describe each of the parts respectively, and then point out the relation between the two, whereby they form one complete lock.

Referring to the letters, A indicates a lock-case; B, a bolt, which is bifurcated, the leg C being provided with a recess D, within which the wing of the hub turns to actuate the bolt.

E E indicate projecting guide-bearings, which slide between the projections F F of the case and control the play of the bolt.

G indicates a pin projecting from the case, against which one of the guide-bearings E of the bolt impinges to limit its forward movement.

I is a recess within the end of the leg C, which embraces the stud J projecting from the case when the bolt has been retracted. Upon this stud is pivoted a series of flat tumblers K, provided at one end with springs L, which bear against the side of the case, and at the other end with gatings M, which, when set by a properly-bitted key X', receive the fence N and allow the bolt to be retracted.

O indicates projections upon the end of the tumblers, which support the tumblers upon the fence N when the bolt is cast, and thereby enable them to dog the bolt.

P indicates the main-key hub, provided with the key-slot Q, and having at one end the wing R and a shoulder S near its middle.

T indicates a detent or dog pivoted upon the stud U, projecting from the case, and provided with the spring V, which bears against the pin W to press the detent against the hub P, but whose motion in that direction is limited by the pin X, projecting from the case. The detent normally dogs the wing R and prevents the rotation of the hub.

Y indicates a bearing upon the case for the detent T.

Z indicates the other leg of the bolt, which is elevated so as to ride over the detent T. This leg is provided with the projection A', whose office will more clearly appear below.

B' indicates one bearing for the hub P.

C' indicates the other bearing of the hub, situated in one side of the escutcheon D', which is secured to the cap E' of the case. Behind the escutcheon is a circular bearing F' for the shoulder S of the key-hub P. Within this bearing extends the key-plug G' of a pin-tumbler lock of well-known construction, which has its bearing at one end in the escutcheon D' and at the other in the plate H, secured to the tumbler-case J', secured by the screw K' to the cap-plate E' of the lock. The bearing ends of the key-plug G' are cylindrical, and between these is an enlarged part L', which is of a larger diameter than the bearings of the plug, and which is made to rotate within the recess M' of the tumbler-case J'. From this part projects a pin N', which plays within the slot O' of the tumbler-case, and thus limits the rotary movement of the key-plug.

P' indicates tumbler-recesses in the key-plug G', and $G^2$ indicate corresponding recesses in the tumbler-case J'.

Q' indicates pin-tumblers of the ordinary construction, and which are actuated in the usual manner by the key R' when inserted within the slot S' of the key-plug. The key is provided with a notch T', which engages with a ledge $T^2$ in the nosing when the key is inserted and turned, and the key cannot be withdrawn until it reaches the slot $T^3$, at which time the supplementary locking mechanism will have been fully unlocked. The key can then be withdrawn and the box-renter can unlock the box at his convenience.

The side U' of the key-plug G' is cut away, for a purpose which will hereinafter be declared.

The shoulder S is so formed that it permits the main hub P to make a little more than a half-rotation, but prevents its further rotation by striking against the key-plug G', (see Fig. 5,) which, as above indicated, projects into the bearing F'.

$U^2$ indicates a projection upon the cap E' to hold the tumblers in position when the cap is secured to the case.

V' $V^2$ indicate cut-away parts in the wing R and in the leg C of the bolt, respectively, (see Fig. 9,) to admit the supplementary mechanism; but this obviously is not a material part of my lock.

The operation of my lock is as follows: Suppose the lock to be locked, the main-key hub to be held from turning by the detent, and the key-slots at right angles to each other. In order to release the key-hub, let the key R' be inserted in the slot S' and rotated to the right. Thereupon the plug G' behind the cap-plate comes into engagement with the detent T and pushes it away from the wing R, and the key may be withdrawn. Now the key X' may be inserted in the slot Q, and the hub P may be rotated until, the tumblers being aligned by the bitting of their key and the fence passing freely within the gatings of the said tumblers, the bolt is retracted by the operation of the wing R, in the usual manner. As soon as the bolt begins to be retracted the projection A' of the leg Z comes in contact with the flat side U' of the key-plug G' and rotates the plug until the bolt has been fully retracted, when the plug will be restored to the locked position. When the plug is thus restored, its flat side U' will be turned toward the detent T, which will thereupon regain its former position and be ready to engage with the plug as soon as the lock is again locked. The key X' cannot, however, be withdrawn so long as the bolt is retracted; but it must first be rotated and the bolt cast. By this operation the wing R returns to its original position and is caught by the detent, as at the beginning.

The construction heretofore described is that in which a flat key is used to operate the guard mechanism; but a key with a round stem might be used, as shown in Figs. 10 and 11. In this construction the following means of protecting the guard mechanism may be adopted. In that part of the detent (lettered T in the above description) which is nearest its pivot may be placed a kind of cross-gating, (lettered $a$.) Upon the pin $b$, projecting from the case, is pivoted a dog $c$, which bears the fence d. This dog is placed underneath the detent and the fence rides in the gating a. If the round-stem guard-key e be inserted, as shown above, and turned to the right, its wing will come in contact with the face of the detent T and will push it aside, so as to release the key f, which is here shown as a round-stem key. A further rotation of the key e causes the fence d to come opposite the horizontal part of the gating a. Continuing to rotate the key in the same direction, the said fence enters the said horizontal part of the gating, and the wing of the key passes clear of the dog and detent and the key may be withdrawn. The detent is now supported by the fence upon the dog, so that the main key may be operated to retract the bolt. In the act of retracting it, however, the projection g upon the leg C of the bolt comes in contact with the projection h on the dog c and pushes it backward until the fence d is released from the gating a and the detent springs into its forward position ready to engage the main-key wing when the bolt has been cast. The main key may now be withdrawn, and while it is withdrawn the detent performs no office, but remains in the position ready to engage the wing of the main key when it is reinserted, so that the main lock cannot be operated by the key without first releasing the detent. The detent has been shown as a single hook; but it may be a series of hooks, laid one upon another, and may so be made to perform the office of a set of tumblers, and may be operated by bitting the guard-key in the ordinary manner.

The construction just described may somewhat diminish the cost of producing the lock, while it does not materially impair its security.

I do not confine myself to the exact form of main locking mechanism or supplementary locking mechanism, as any of the well-known substitutes for the flat tumblers used in the former or the pin mechanism used in the latter may be employed.

I claim—

1. In a lock, the combination of a hub for guiding and supporting the main key, a detent or dog preventing the movement of said hub, and a supplementary mechanism for releasing said detent, substantially as described.

2. In a lock, the combination, with the bolt, of main locking mechanism therefor and supplementary locking mechanism operatively connected with said main locking mechanism, said bolt being so arranged that in retracting it moves the supplementary locking mechanism into the locked position, substantially as described.

3. In a lock, the combination of main and supplementary locking mechanisms, each provided with a separate key-hub located within the same cylinder or nosing, said locking mechanisms being so adjusted with reference to each other that the key-holes of said key-hubs occupy different relative positions, thereby indicating from the outside whether the two locking mechanisms are locked or unlocked, substantially as described.

In testimony of all which I have hereunto subscribed my name.

WARREN H. TAYLOR.

Witnesses:
SCHUYLER MERRITT,
GEO. E. WHITE.